United States Patent
Seiders et al.

[11] Patent Number: 5,683,063
[45] Date of Patent: Nov. 4, 1997

[54] ELEVATED CAMERA MOUNT

[75] Inventors: Stephen C. Seiders, McConnellsburg; M. Lamont Brady, Big Cove Tannery, both of Pa.

[73] Assignee: JLG Industries, Inc., McConnellsburg, Pa.

[21] Appl. No.: 605,789

[22] Filed: Feb. 22, 1996

[51] Int. Cl.⁶ .......................... B66F 3/00; F16M 13/00
[52] U.S. Cl. ........................ 248/214; 396/428; 182/2
[58] Field of Search ........................ 248/214, 230.4, 248/231.51, 295.1; 182/63, 2, 129; 396/419, 428

[56] References Cited

U.S. PATENT DOCUMENTS

| | | | |
|---|---|---|---|
| 2,787,278 | 4/1957 | Mitchell et al. | 134/115 |
| 3,554,317 | 1/1971 | Birbanescu et al. | 182/14 |
| 3,613,546 | 10/1971 | Richardson | 396/428 |
| 3,809,180 | 5/1974 | Grove | 182/2 |
| 4,899,097 | 2/1990 | Chapman | 318/663 |
| 5,033,705 | 7/1991 | Reagan | 248/123.1 |
| 5,037,068 | 8/1991 | Grottesi | 254/8 B |
| 5,177,516 | 1/1993 | Fitz et al. | 354/81 |
| 5,531,412 | 7/1996 | Ho | 396/428 |

Primary Examiner—Alvin C. Chin-Shue
Assistant Examiner—Long Dinh Phan
Attorney, Agent, or Firm—Foley & Lardner

[57] ABSTRACT

A camera mount assembly for mounting a camera on vertically spaced rails of a platform secured to and adapted to be elevated by aerial lift equipment, said assembly comprising support means including generally horizontal cantilevered sections extending outwardly from or inwardly of a first rail of the platform for supporting a camera, and vertically extending sections extending downwardly adjacent a second, lower rail of the platform. The assembly includes a latch member for engaging the upper rail and a member for engaging the lower rail, so that weight loading on the assembly is transferred to both the upper and lower rails. The assembly can be quickly and easily mounted on or removed from the rails.

13 Claims, 4 Drawing Sheets

ELEVATED CAMERA MOUNT

BACKGROUND OF THE INVENTION

The present invention relates as indicated to an elevated camera mount, and relates more particular to a camera mounting assembly which can be quickly and easily mounted on a platform or basket mounted on aerial lift equipment for television and motion picture production.

The mounting of television or motion picture cameras on elevatable equipment is well known in the art. Typical are camera dollies in which a dolly or platform is mounted on a mobile base, with a hoisting device being mounted on the dolly for elevating the camera to the desired height. A typical hoisting device of this type is shown in U.S. Pat. No. 5,037,068. U.S. Pat. No. 5,033,705 also shows a camera dolly on which are rotatably mounted support and yoke arms, with the support arm carrying a camera platform at its distal end. Camera dollies of this type are normally limited in the height to which the cameras can be elevated, and are simply not viable alternatives where elevations beyond a certain height are required.

It is also known to mount a camera support platform on pivotally mounted boom members the lower boom of which is rotatably mounted on the chassis of a truck or lorry. Although this arrangement might be satisfactory for outdoor scenes where maneuvering space is not a problem, its potential use indoors is limited. In addition, the maximum vertical reach by the boom assembly is limited.

Aerial lift equipment, for example, extendable boom lifts or scissor lifts which extend vertically from a mobile base, have also been used to support camera equipment at elevated heights. The extendable boom is provided with a platform or basket (these terms are used synonymously throughout the present description) at its outer end which typically provides support for one or more persons to perform service-type tasks. Scissor lifts typically include a platform relatively large in size, 30" by 72", for example, from which one or more workers can perform various service functions when the lift is elevated.

Platforms of aerial lift equipment typically comprise frames including a floor and vertically spaced tubular metal rails interconnected to other frame members to form the structure. The use of such platforms with extensible boom lift equipment and scissor lifts having substantial extension capabilities is ideally suited for elevated camera work in view of the height which can be obtained and the flexibility with respect to angle. In extensible boom lifts, for example, the platform can rotate without obstruction thereby providing almost limitless locations with regard to height and angle. Similarly, the scissor lifts are normally mounted on a mobile chassis which is very flexible in terms of position or location.

Although aerial lifts are being used more frequently to mount cameras which require to be elevated, present mounting techniques are less than satisfactory. Typically, television and motion picture equipment are mounted on tripods that are variably secured to the platforms. A typical arrangement is the use of wooden planks positioned on the floor of the lift platform, for example, and to which the camera supports are strapped or otherwise secured. This type of camera support and mount is undesirable for any number of reasons. The rigging of a make-shift support and then strapping a standard tripod mounted camera to this support is a very imprecise and potentially dangerous procedure. There is the danger of expensive camera equipment falling. Further, the safety of the camera operator is jeopardized in those situations where rails have been removed to set the camera platform. The safety of persons underneath the aerial lift is also at risk, and this may include large work crews and spectators.

Since the use of aerial equipment has numerous advantages for camera mounting, perhaps the most important of which is that such equipment can potentially be used with little or no modification, it was highly desirable to create a mounting assembly in which camera equipment could be quickly and easily mounted on presently constructed lift platforms to provide stable support.

SUMMARY OF THE INVENTION

A principal object of the present invention is to provide a camera mount assembly which can be quickly and easily mounted on the rails of platforms secured to aerial lift equipment such as extensible boom lifts and scissor lifts. The assembly is partially cantilevered relative to the platform and is adapted to receive a mounting plate or the like to which a television or motion picture camera can be secured. In known manner, the lift equipment can elevate the platform within the operating parameters of the equipment, and in many instances the platform can be rotated relative to the mobile base for moving the camera to any desired position.

A further object of the invention is to provide such a camera mount assembly which can easily accommodate variations of the vertical spacing of the rails of the frame which forms the platform. The spacing between the top rail and the mid rail, for example, may vary substantially based on the size and type of platform, and the assembly of the present invention is able to accommodate such variation. This permits the mount assembly of the present invention to be used with new equipment or equipment in the field, thereby substantially expanding the potential use of the invention.

In accordance with the invention, the mount assembly includes upper clamps for engaging the top rail of the platform in such a manner that any weight placed on the cantilevered section increases the security force on the rail. The assembly further includes bottom clamp means or clamping the mount assembly to the vertically spaced mid rail of the platform.

The invention in its more specific aspects includes a camera mount assembly for adjustably mounting a camera on vertically spaced rails of a platform secured to and adapted to be elevated by aerial lift equipment, with the assembly comprising, in the form shown, a pair of spaced and interconnected members with a camera support, upper clamp means adapted to clampingly engage an upper rail of the platform, and a separate angle member attached to said members for engaging a lower rail, the rails being engaged in a direction such that the weight load of the camera is transferred to both rails. It will be understood that more than two members could be used and that, if sufficiently wide, a single member could be used.

A further, more specific feature of the present invention is to provide a mount assembly in which the members cantilevered from the platform and supporting the camera comprise generally L-shaped tubes, round in the form shown, with the vertically extending sections of the tubes telescopically receiving a second pair of tubular members. It will be understood that the L-shaped tubes could have cross-sectional configurations other than round, for example, square or rectangular. The telescopic arrangement permits the assembly to be quickly and easily adjusted to accommodate various vertical spacings between the top and mid rails of the platform.

These and other objects of the invention will be apparent as the following description proceeds in particular reference to the application drawings.

DETAILED DESCRIPTION OF THE PREFERRED EMBODIMENTS

Figure 1:
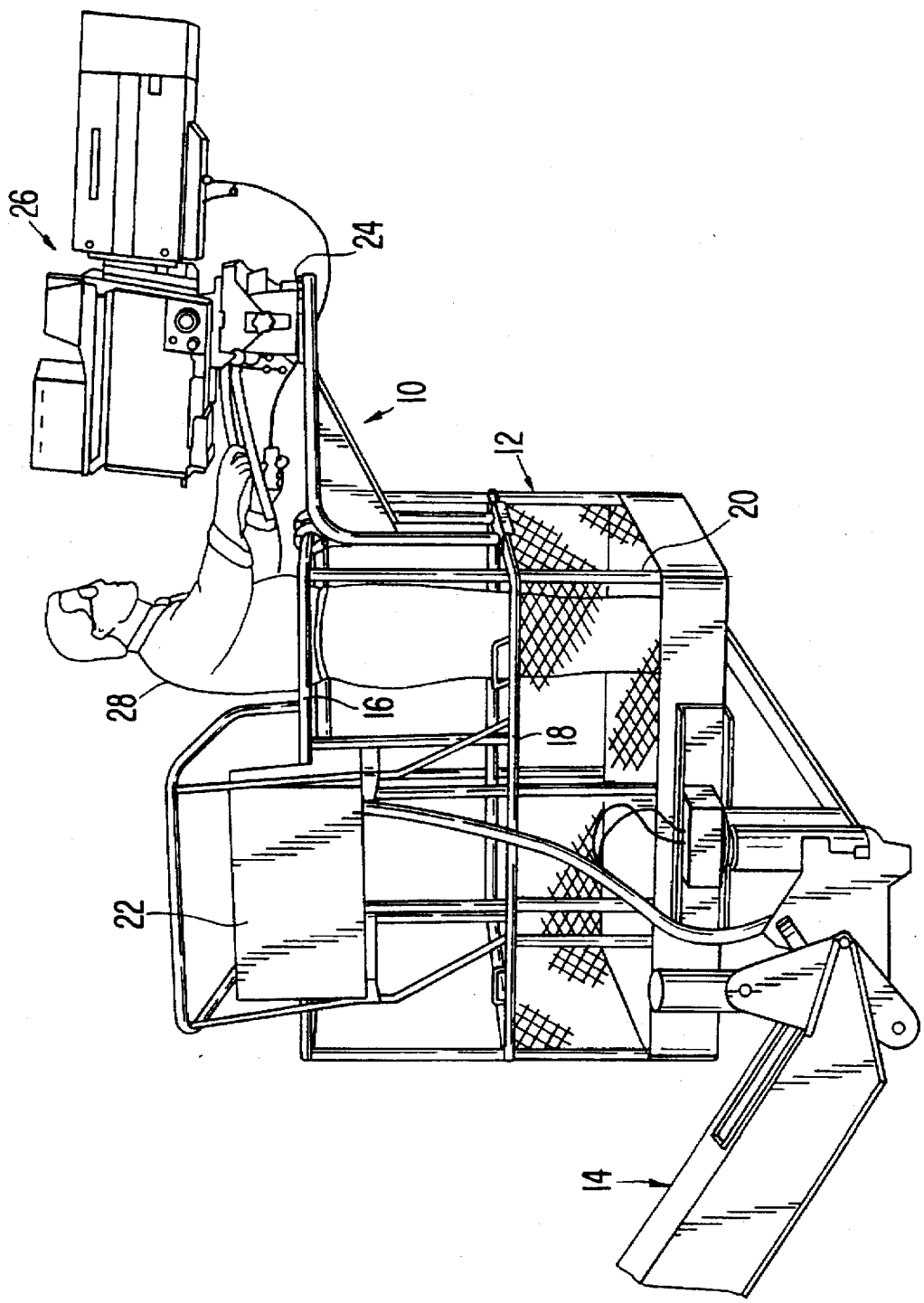
FIG. 1 is a side elevational view showing the camera mount of the present invention mounted on the top and mid rails of a platform attached at the end of a fragmentarily shown boom lift.

Referring now in more detail to the application drawings, wherein like parts are indicated by like reference numerals, and initially to FIG. 1, the camera mount assembly of the present invention is generally indicated at 10 and is mounted on a platform generally indicated at 12 mounted at the end of a boom lift generally indicated at 14. The platform 12 in the form shown includes a top rail 16, a mid rail 18, and a floor 20, all of which are spaced and interconnected to provide a supporting platform in which a worker or workers can stand for accomplishing the desired task. In the form shown, the platform includes a control panel 22 by means of which the platform can be moved independently in all directions, all in a well-known manner.

The platform 12 is typical of platforms of this type, and per se forms no part of the present invention. Platforms of this type are useful for a great many purposes, but have not previously been satisfactorily and safely used for mounting cameras.

Although a boom lift has been shown carrying the platform, it should be understood that the camera mount assembly of the present invention could be used with other types of aerial lift equipment as well, for example, a scissors lift in which a platform is secured to and elevatable by the scissors lift. The manner in which the platform 12 is controlled relative to the aerial lift apparatus forms no part of the present invention, and the generally diagrammatic showing of the connection between the platform and the lift will not be described in detail.

Mounted on the camera mount assembly is a universal camera mounting plate 24 on which is rotatably mounted a camera 26 operated by a cameraman represented at 28. The mounting plate 24 per se forms no part of the present invention, and is standard in the industry and known as a "Mitchell Base Plate", permitting the camera, when mounted to the plate, to be rotated in the desired direction. The camera mounting plate and camera have accordingly been shown only diagrammatically in the application drawings. It will be understood that other forms of mounting the camera could be used and appropriately mounted on the camera mount assembly.

Referring to FIGS. 2–5, the camera mount assembly 10 comprises a pair of L-shaped metal tubes commonly designated at 30, with the top, generally horizontally extending tube sections 32 being spaced and interconnected by a connecting plate 34 adjacent the front ends of the tubes 32, with the plate 34 serving as a mounting support for the camera mounting plate 24. The connecting plate 34 can be secured to the tubes by any suitable means, for example, welding.

The vertically oriented sections 36 of the metal tubes 30 are spaced and interconnected as will be described below, and in the form shown a plate 38 is secured to the sections 32 and 36 of each tube for strengthening the same. The plates 38 could be eliminated if tubes of a higher section modulus are utilized.

Figure 5:
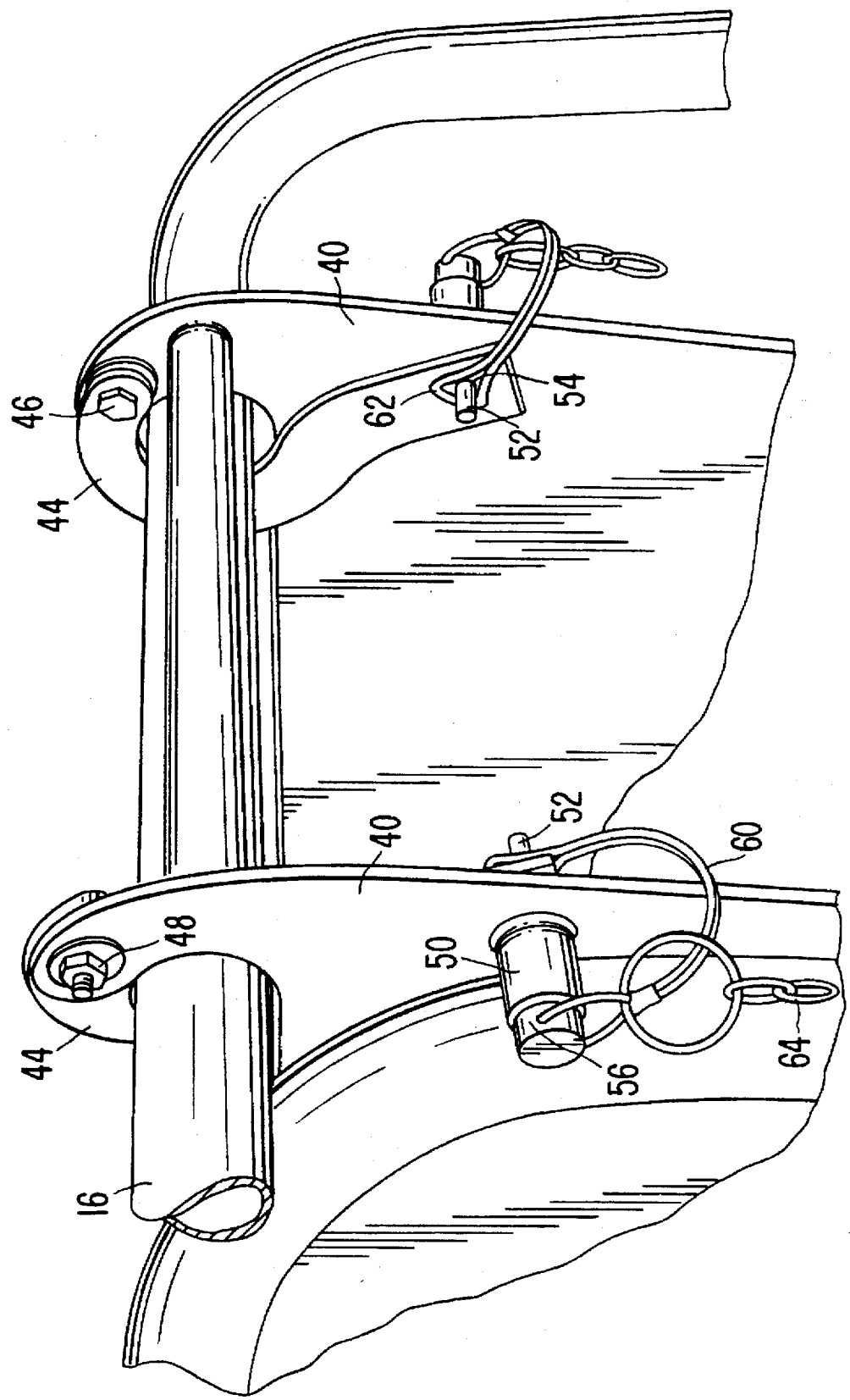
FIG. 5 is a fragmentary enlarged view showing in more detail the upper clamps in operative position around the top rail of the platform.

Each plate 38 includes or has connected thereto an upwardly directed latch member 40 suitably shaped to accommodate the configuration of the upper rail 16. The latching mechanism further includes a movable latch or retaining member 44 pivotally connected at 45 to the fixed latch number 40 for movement between an open position shown in dashed lines in FIG. 2, in which the fixed latch member can extend around the upper rail, and a closed position shown in FIG. 5 and solid lines in FIG. 2 in which both latch members extend around the upper rail for securely retaining the assembly 10 on the upper rail. Referring to FIG. 5, the movable latch member 44 is pivotally mounted on the fixed latch member 40 by means of nut 46 and bolt 48 which extend through openings in the respective latch members.

The latch members 44 can be secured in their closed position by any suitable means such as the locking arrangement shown in FIG. 5. A lock housing 50 is mounted on the fixed latch member 40 and includes a lock pin 52 adapted to extend through an opening 54 formed in the free end of the movable latch member 40. The pin is integrally formed with pin section 56. Secured to each pin section 56 is a generally U-shaped yoke 60 having a free end 62 extending over the pin 52 when the assembly is mounted. Secured to the yoke at the end adjacent the plunger is a chain 64 adapted to engage the latch for the bottom rail (in a manner not shown), by means of which downward locking pressure can be placed on the plunger and lock when the assembly is clamped to the lower rail 18. When the arms of the yoke are compressed toward each other, the pressure on the pin 62 is released, and the pin can be withdrawn.

The diameter of the tubular rails and the spacing between the upper and mid rails of platforms may differ in various types and models of aerial lift equipment, and the present invention is adapted to accommodate these differences. Referring to the embodiment shown in FIG. 2, reduced diameter tubes 70 are telescopically received within the tubular sections 36 thereby to accommodate variances in vertical spacing between the top and bottom rails.

Figure 3:
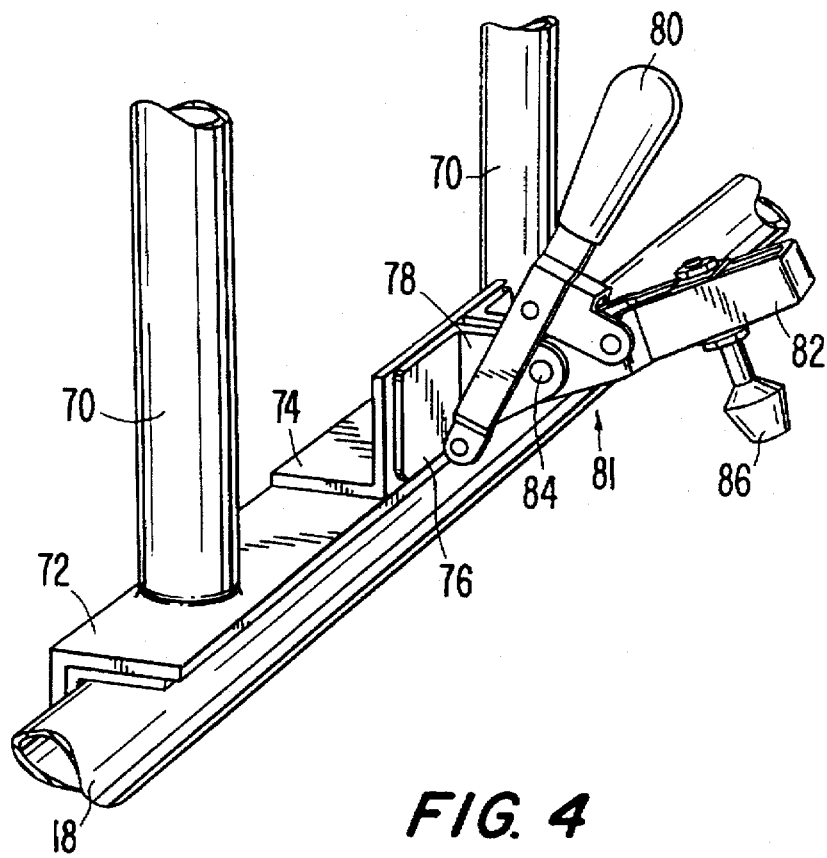
FIG. 3 is a fragmentary top perspective view showing the lower clamp in open position disengaged from the mid rail.
Figure 4:
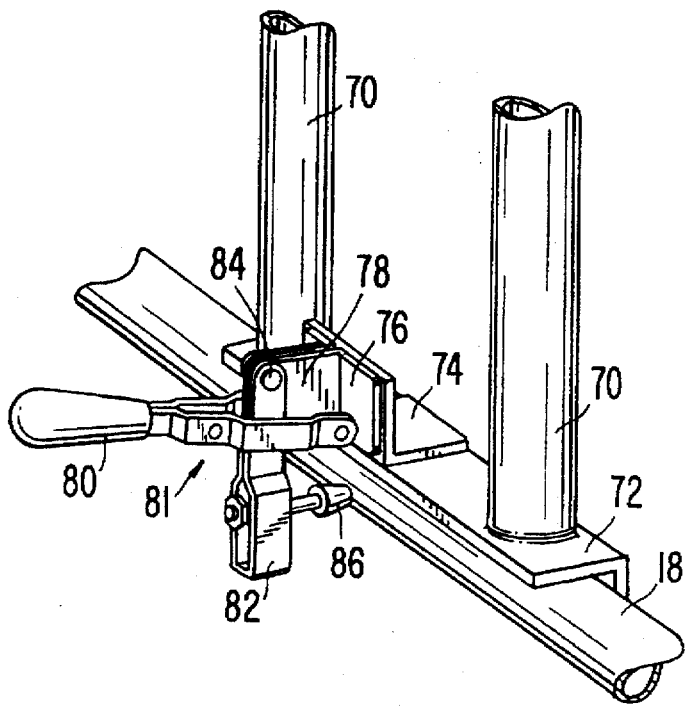
FIG. 4 is a perspective view similar to FIG. 3, showing the lower clamp in operative position clamping the mid rail.

Referring to FIGS. 3 and 4, the reduced size tubes 70 (or the bottom of the tubes 36 in the FIG. 1 embodiment) are secured, for example, by welding, to a generally L-shape angle member 72. An angle mount 74 is attached to the top leg of the angle 72, and a latch bracket 76 is attached to the angle mount 74. The latch bracket 76 includes a rearwardly directed clevis-like portion 78 to which is pivotally mounted the latch handle 80 of the bottom latch, generally indicated at 81. The bottom latch further includes a latch member 82 pivotally secured at 84 to the bracket portion 78, with the latch member 82 having mounted thereon a latch pin 86 adapted to contact the mid rail 18 when the latch 81 is in a closed or clamping position.

The bottom latch 81 is shown open in FIG. 3, in which position, when the upper clamp is opened, the mount assembly can be swung away from the mid rail 18 for dismounting the assembly. When the assembly is to be mounted, the angle 72 is positioned as shown in FIG. 3, and the latch handle 80 moved downwardly to its FIG. 4 position in which the latch pin 86 firmly engages the mid rail 18 to secure the mount assembly at that location. The bottom latch 81 shown is a common over-center clamp and per se forms no part of the present invention. Different bottom clamping arrangements could be used consistent with the objective to provide a clamp which can be quickly opened and closed and which provides tight clamping effect when actuated.

Figure 2:
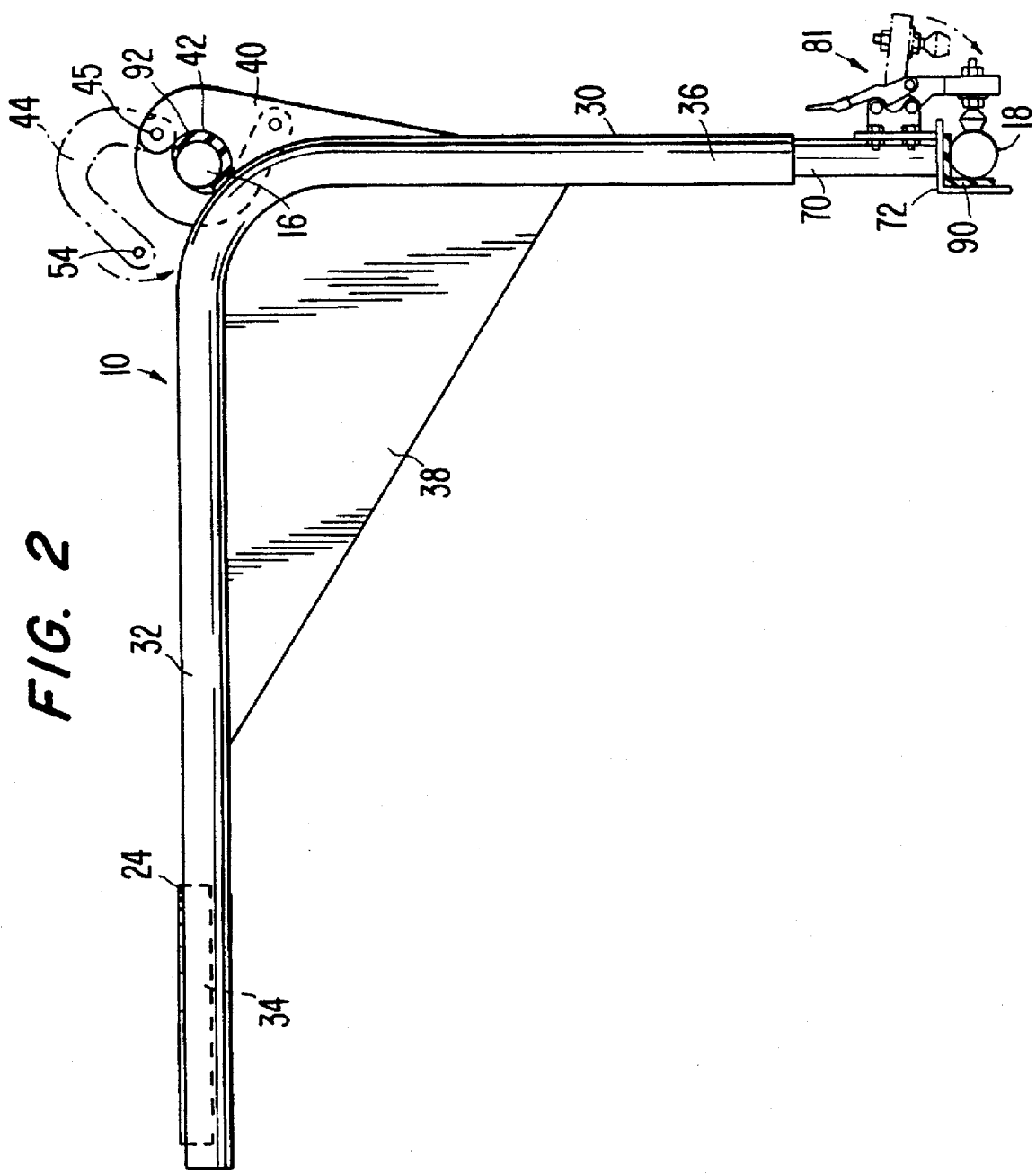
FIG. 2 is a side elevational view of the camera mount assembly, with the upper latch members and lower latch members being shown in solid lines in operative position engaging the upper and mid rail, and shown in an open position in dashed lines.

In order to minimize vibrations transmitted to the camera and to minimize damage to the finish of the rails, the inside of the angle 72 is preferably provided with a cushioning pad 90 (FIG. 2) formed of rubber or the like, and a similar rubber cushioning pad can be provided on the inside curved surface 42 of the fixed latch number 40, as shown at 92 in FIG. 2.

It will be seen that the mount assembly illustrated and described accommodates substantially variable spacing between the top and mid rail. However, in the event the platform with which the assembly is used has consistently spaced top and mid rails, the telescoping legs 70 could be eliminated. In such event, the legs 36 would be secured directly to the angle 72, with other features, including the lower latch, being similar to the arrangement illustrated and described.

The mounting and operation of the camera mount assembly of the present invention should be apparent from the above description. To briefly summarize, the assembly 10 can be quickly mounted around the top rail 16 and mid rail 18 when the upper and lower clamps are in the dashed line positions thereof as shown in FIG. 2. Any weight placed on the assembly at that point simply increases the pressure transmitted from the fixed latch member 40 to the upper rail 16 and the angle 72 to the lower rail 18. The moveable latch members 44 can then be clamped around the upper rail and retained as described, and the lower clamp 81 moved to its FIG. 4, clamped position. This can be quickly and easily accomplished, and provides a highly stable mount arrangement. If not mounted beforehand, the camera mounting plate 24 can then be secured to the connecting plate 34, and the camera mounted on the mounting plate. To remove the mount assembly from the platform, the reverse procedure is followed.

Although the invention has been specifically designed for simple and stable mounting to an aerial lift platform, it will be understood that the mount assembly could satisfactorily operate with other equipment as well. For example, any fixed or movable structures having, or capable of being modified to have, spaced rails or comparable mounting surfaces could be utilized. The ability to provide a highly stable camera mount assembly which can be easily assembled and disassembled represents a clearly advantageous and unique advance in the art.

Although the camera is shown in FIG. 1 extending above the mounting plate 24, it will be understood that there may be instances in which the bottom mounting of the camera is desired, for example, where the camera is operated by remote control. In such event, the mounting plate 24 can be secured to the bottom surface of the fixed connecting plate 34.

It will further be noted that the mount assembly has a relatively narrow overall width, thereby permitting the same to be mounted where desired along the length of the upper and mid rail of the platform. Wherever mounted, the weight of the camera is directly transmitted to the platform. In some applications it may be desirable to mount the camera inside the platform, and in such event the upper leg sections 32 of the tubes would be cantilevered internally. The invention readily accommodates mounting the camera internally or externally of the rails, to accommodate the preferred use of the camera.

When telescoping lower tubes are used to increase the adaptability to variably spaced rails, the telescoping legs can be secured in any position using threaded locking fasteners extending through threaded openings in the outer tubes and engaging the inner tubes. Alternatively, any other means well known in the art could be used for maintaining the tubes in their adjusted position.

It will be seen that the loading on the mount assembly due to the weight of the camera is very effectively transferred both to the upper and mid rails. Both the fixed upper latch member and the angle secured at the bottom of the tubes engage the upper and lower rails, respectively, in a direction to directly transfer the load to the rails. This provides a highly stable mount for the camera.

What is claimed is:

1. A camera mount assembly for mounting a camera on vertically spaced rails of a platform or the like, comprising:

camera support means including a generally horizontal cantilevered section adapted to extend laterally of a first rail of the platform for supporting a camera, and a vertically extending section adapted to extend downwardly adjacent a second, lower rail of the platform, means associated with said support means for engaging said first rail in a direction such that a portion of weight load of the camera on the cantilevered section is transferred to said first rail, means associated with said vertically extending section for engaging said lower rail in a direction such that a portion of weight load of the camera is also transferred to the lower rail, and latch means attached to said means engaging said lower rail, said latch means when actuated being adapted to engage said lower rail for clamping said vertically extending section to said lower rail.

2. The assembly of claim 1, wherein said support means comprise generally L-shaped members formed of tubular metal, with the tubes in their cantilevered sections being spaced by and connected to a connecting plate which in turn provides support for a mounting plate for said camera.

3. The assembly of claim 1, wherein said means for engaging said upper rail comprises a fixed latch member secured to said camera support means and formed with a surface complementary to the configuration of said upper rail so that said surface transmits loading from said camera to said upper rail.

4. The assembly of claim 3 further including a movable latch member pivotally connected to said fixed latch member and having an engaging surface for engaging the opposite side of said upper rail when said movable latch member is moved to a closed position, and means for retaining said movable latch member in said closed position.

5. The assembly of claim 4, wherein said latch retaining means comprises a housing mounted on said fixed latch member and provided with a withdrawable pin, said movable latch member being formed with an opening adapted to receive said pin to latch the movable latch members in its closed position.

6. The assembly of claim 1, wherein said means associated with said vertically extending sections for engaging said lower rail comprises an angle member, said angle member being generally L-shaped and adapted to receive therewithin the lower rail whereby loading can be transferred from said members through said angle member to said lower rail.

7. The assembly of claim 6, wherein said latch means is mounted on a bracket secured to said angle member, said latch means including a rail engaging pin adapted to firmly engage said lower rail when said latch means is moved to an actuated position.

8. The assembly of claim 6, further including a compressible resilient pad secured to the surface of said angle member which engages said lower rail, said pad serving to reduce vibrations in the camera mount assembly.

9. The assembly of claim 1, wherein said vertically extending sections of said support means comprise tubular sections integrally formed with said cantilevered sections of said support means, and further including reduced dimension tubular members received within said vertically extending tubular sections for telescoping movement relative thereto, said telescoping tubular members carrying said means for engaging the lower rail, and means for retaining the reduced diameter tubular members in their vertically adjusted positions, whereby platforms having variable spacing between said upper and lower rail can be accommodated.

10. The camera mount assembly at claim 1, wherein said support means are generally L-shaped and formed of tubular metal, wherein said means for engaging said upper rail comprises fixed latch members having curved engaging surfaces complementary in shape to the configuration of said upper rail, and wherein said means for engaging said lower rail comprises an angle member secured to the bottom of said support means and rigidly interconnecting the same.

11. The assembly of claim 10, wherein the engaging surface of said angle and the surface of said fixed latch members are provided with resiliently compressible pads for dampening and isolating vibration in said mount assembly.

12. The assembly of claim 1, wherein said assembly is mounted on said rails so that said camera is positioned laterally outwardly of said rails.

13. The assembly of claim 1, wherein said assembly is mounted on said rails so that said camera is positioned laterally inwardly of said rails.

* * * * *